Jan. 30, 1951  E. A. WILKENSON ET AL  2,539,713
DEVICE FOR TESTING THE DEVIATION OF INSTRUMENTS
Filed Dec. 10, 1945  3 Sheets-Sheet 1

Inventors
E. A. Wilkenson
P. T. Faxen

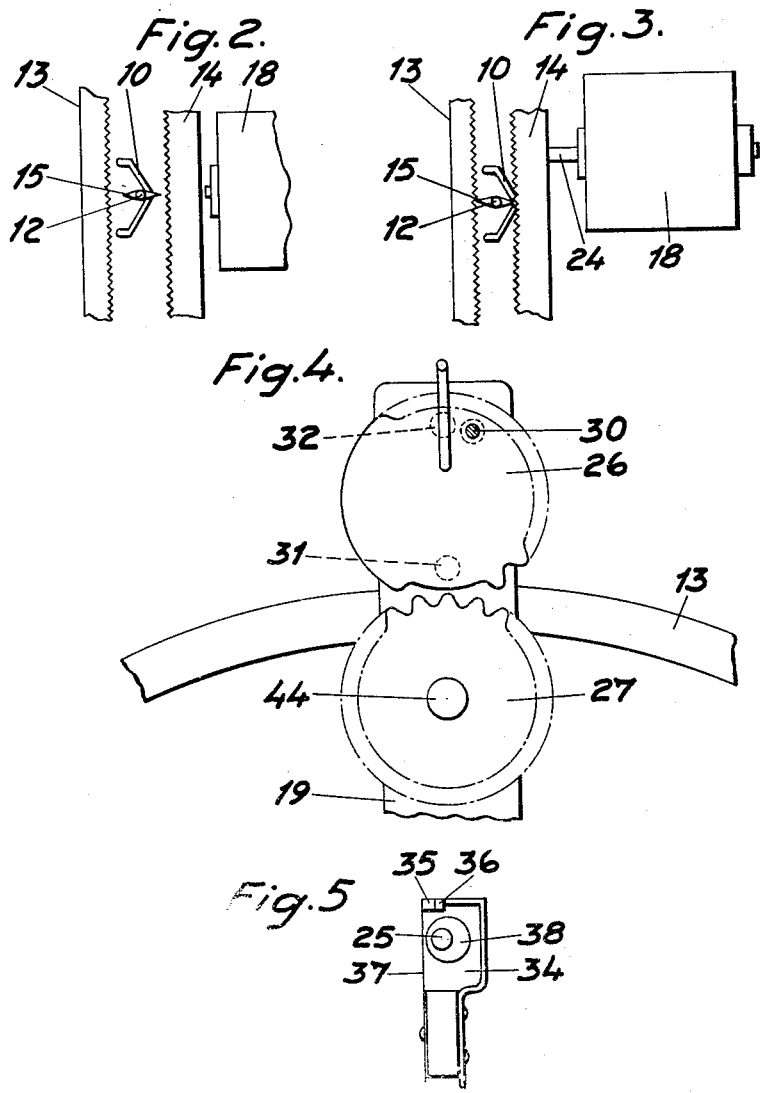

Jan. 30, 1951 E. A. WILKENSON ET AL 2,539,713
DEVICE FOR TESTING THE DEVIATION OF INSTRUMENTS
Filed Dec. 10, 1945 3 Sheets-Sheet 3

Inventors
E. A. Wilkenson
P. T. Faxon

Patented Jan. 30, 1951

2,539,713

UNITED STATES PATENT OFFICE 2,539,713

DEVICE FOR TESTING THE DEVIATION OF INSTRUMENTS

Erik Alvar Wilkenson and Per Torsten Faxén, Linkoping, Sweden, assignors to Svenska Aeroplan Aktiebolaget, Linkoping, Sweden, a joint-stock company of Sweden Application December 10, 1945, Serial No. 634,054
In Sweden June 17, 1941

Section 1, Public Law 690, August 8, 1946
Patent expires June 17, 1961

21 Claims. (Cl. 73—1)

The present invention relates to a mechanical device for testing the deviation of instruments and the like, particularly of gyroscopes and similar instruments, in which the deviation of the instrument can be tested without, or with very little, disturbing influence upon the said deviation. The device is characterised by a member following the deviation of the instrument, which member, when the deviation is to be tested, is retained in its position then assumed, whereafter a member testing the deviation of the instrument is advanced to the first-mentioned member and is stopped by the same.

The invention is intended to be used in those instruments in which errors easily can arise in the deviation of the instrument if the device making the deviation is loaded with some devices braking its movement, or in which the instrument shall control the position of some other device but not be actuated itself by the device controlled thereby. Preferably, it should be used as direction testing device in gyroscopes or other direction indicating instruments or in devices controlled by such instruments, in order to transmit the direction impulses from the instrument to the device in question.

An embodiment of the present invention used as direction testing device in a gyroscope or as transmitting means for the direction impulses from a gyroscope is to be described more particularly below, reference being had to the accompanying drawings, in which:

Figs. 2 and 3 are top views on a larger scale of part of the testing device in the position when testing shall not take place, and when testing shall take place respectively.

Fig. 4 shows another part of the testing device on a larger scale,

Fig. 5 shows a switch device in the testing device.

Figure 1:
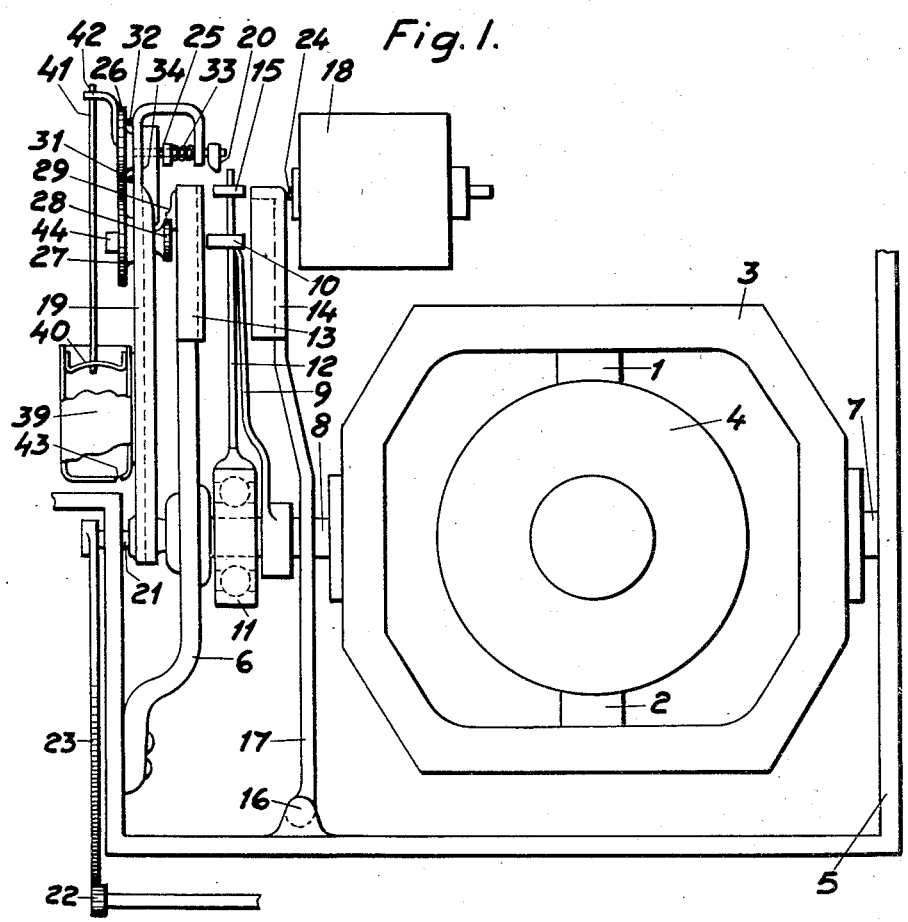
Fig. 1 shows a gyroscope provided with a device according to the invention in side elevation.

Fig. 1 shows a gyroscope located in a known way in a gyro case 4 which is swingable around two pivots 1 and 2 relatively to a Cardan ring 3. The Cardan ring 3 is by means of two pivots 7 and 8 swingably mounted in a frame 5 and in a console 6 fixed to the frame 5, the said pivots 7 and 8 being located at right angles to the pivots 1 and 2.

The gyroscope is driven in any known way mechanically, electrically, pneumatically, hydraulically or otherwise. To the pivot 8 there is fixed an arm 9 which participates in the oscillations of the Cardan ring around the pivots 7, 8. The arm 9 carries in its upper portion a V-shaped member 10 which is located at right angles to the arm and which is rigidly connected therewith. The opening of the member 10 is turned to the left on the drawing, see Fig. 2, which shows a top view of the said detail. To the pivot 8 or to another shaft concentric therewith there is pivoted, for example by means of a ball bearing 11 or the like, another arm 12 which is resilient with respect to movements in the direction of the pivot and extends upwards through and past the V-shaped member 10. The resilience of said arm 12 is such that in the neutral position when the position of the gyro shall not be tested, the arm 12 rests on the angle corner of the V-shaped member and is thus carried along by the arm 9 at the movements of the gyro. Two arcs 13 and 14 having their centres in the axis of the pivots 7 and 8, are provided on each side of the arm 12 with the arcs right before a cross piece 15 located in a plane at right angles to the said axis in the upper portion of the arm 12. The arc 13 to the left of the arm 12 is rigidly connected with the frame 5, while the other arc 14 is located on an arm 17 which is swingable in such a way around a joint 16 provided in the frame 5 that the arc 14, for example by means of an electromagnet 18, can be swung against the cross piece 15 and move the same with the arm 12 forwards the arc 13. By this the upper end of the arm 12, which end is located above the cross piece 15, is moved into the path of a projection 20 provided in the upper end of an arm 19. The last mentioned arm is rigidly connected and swingable with a shaft 21 which is mounted concentrically with the pivots 7 and 8 in the frame 5 and in the console 6. The arm 19 can be swung by means of a servomotor (not shown on the drawing) so that the projection 20 engages the upper end of the arm 12. Preferably, the servomotor can act upon a small pinion 22 which drives a toothed arc 23 fixed on the shaft 21. Of course, the arm 19 can also be swung in any other mechanical or manual way.

The testing device now described operates as follows: When the gyro is rotating but the position of the same shall not be tested, the current to the electromagnet 18 as well as to the servomotor is broken. The arm 19 is, by means of suitable devices not shown on the drawing, held swung to a certain initial position. Thus, the arm 9 with the arm 12 follows the oscillations of the Cardan ring 3 around the axis determined by the pivots 7 and 8. The cross piece 15 will then be moved between the arcs 13 and 14. When the position of the gyro is to be tested, the current to the electromagnet 18 and to the servomotor is closed. The electromagnet then moves its armature 24 to the left whereby the arc 14 is swung towards the cross piece 15, which in its turn, against the resiliency of the arm 12, will be swung against the stationary arc 13, with the result that the cross piece 15 is tightly squeezed in between the arcs 13 and 14 in the position (see Fig. 3), which the cross piece had when the impulse for testing the position of the gyro was given. In order to firmly retain the cross piece between the arcs, those surfaces of the arcs which face the cross piece, can be provided with teeth, as shown on the drawing, or be coated with some material, e. g. rubber, with gerat friction coefficient. As will be seen from Fig. 3, the arm 12 is now located right between the legs of the V-shaped member on the arm 9. By this the V-shaped member can oscillate a little during the testing movement without striking against the arm 12 and thereby disturbing the gyro. In the meanwhile the servomotor swings the arm 19 with the projection 20 towards the upper end of the arm 12, the said end being contacted by the projection, with the result that the swinging movement of the arm 19 is stopped. There can be provided a suitable coupling, for example a friction coupling, which allows that the servomotor nevertheless can continue its movement. The angle through which the arm 19 then has moved, corresponds to the position of the gyro when the impulse for testing the same was given.

Such measure can be taken that, when the projection 20 contacts the arm 12, the current to the servomotor and possibly also to the electromagnet 18 is broken. In such case the friction coupling just mentioned can be omitted. In the drawing there is shown a device by which this can be effected and by which also a soft braking of the movement of the arm 19 is obtained. The projection 20 is here fixed on a shaft 25 which is turnably mounted in the arm 19, a gear wheel 26 being fixed to the opposite end of the said shaft. On a shaft 44 which is turnably mounted below the shaft 25 in the arm 19 there is fixed another gear wheel 27, the teeth of which can mesh with the teeth of the gear wheel 26, see also Fig. 4. To the other end of the shaft 44 there is fixed a small gear wheel 28 which meshes with a toothed arc 29 fixed on the console 6 and having its centre in the shaft 21. Upon the swinging of the arm 19 at the rotation of the shaft 21 the gear wheel 28 will roll along the toothed arc 29 and be driven by the same. The gear wheel 28 now drives the gear wheel 27 by means of the shaft 44. By means of the pin 30 in the gear wheel 26 and by means of two pins 31 and 32 fixed in the arm 19 the gear wheel can rotate about half a revolution only. As long as the projection 20 is not in contact with the arm 12 the gear wheel 26 is, by means of a suitable spring device 33, held in such a position that the pin 30 rests on the pin 32, whereby a recess in the teeth of the gear wheel 26 will be located right before the gear wheel 27. Thus the gear wheel 27 cannot drive the upper gear wheel 26. When during the swinging movement of the arm 19 the projection 20 contacts the upper end of the arm 12, it is swung and turns the shaft 25 with the gear wheel 26 a small distance. The teeth of the gear wheel 26 now mesh with the teeth of the gear wheel 27, whereby the gear wheel 27 will drive the gear wheel 26 around its shaft. A casing 34 which is located on the arm 19 and through which the shaft 25 extends, see Fig. 5, contains a switch device for the servomotor and possibly also for the electromagnet 18. The said switch device consists of two contacts 35 and 36 which normally are made to contact one another by means of a spring 37. On that part of the shaft 25 which traverses the casing 34, there is located an eccentric disk 38 which, when the shaft 25 is rotated by the gear wheel 27, moves the contacts 35 and 36 away from each other. The current to the electromotor is then broken and the motor stops.

In order to softly brake the arm 19, which also in this case, although not necessarily, can be connected to the servomotor via a friction coupling, there is on the arm 19 fixed a cylinder 39. A plunger 40 travels in the said cylinder, which plunger by means of a plunger rod 41 and a crank arm 42 fixed in the gear wheel 26 can be pressed down in the cylinder 39 at the rotation of the gear wheel 26. Then the air contained in the cylinder 39 will be pressed out through a small hole 43 in the cylinder while at the same time exerting a resistance to the movement of the plunger. The resistance to the movement of the plunger becomes the greater the more rapid the plunger is pressed down in the cylinder. In this way the movement of the gear wheel 26 and thus the movement of the arm 19 are softly braked.

If, as already mentioned, such measures have been taken that the switch 35, 36 also breaks the current to the electromagnet 18, the arm 12 will, due to the resilience of the same, swing back towards the V-shaped member 10 on the arm 9 and by the legs of the said member be moved to rest on the angle corner therein. The arm 12 now participates in the movements of the gyro again, and is ready for the next testing movement. By means of suitable devices (not shown) the arm 19 can be returned to its initial position from which the next position of the gyro can be tested.

Preferably, the legs of the V-shaped member 10 and the angle between them are made so large that at least in normal cases the arm 12 has not time during the testing movement to be moved towards one of the legs by the gyro which of course continues its movement in the meantime.

Figure 6:
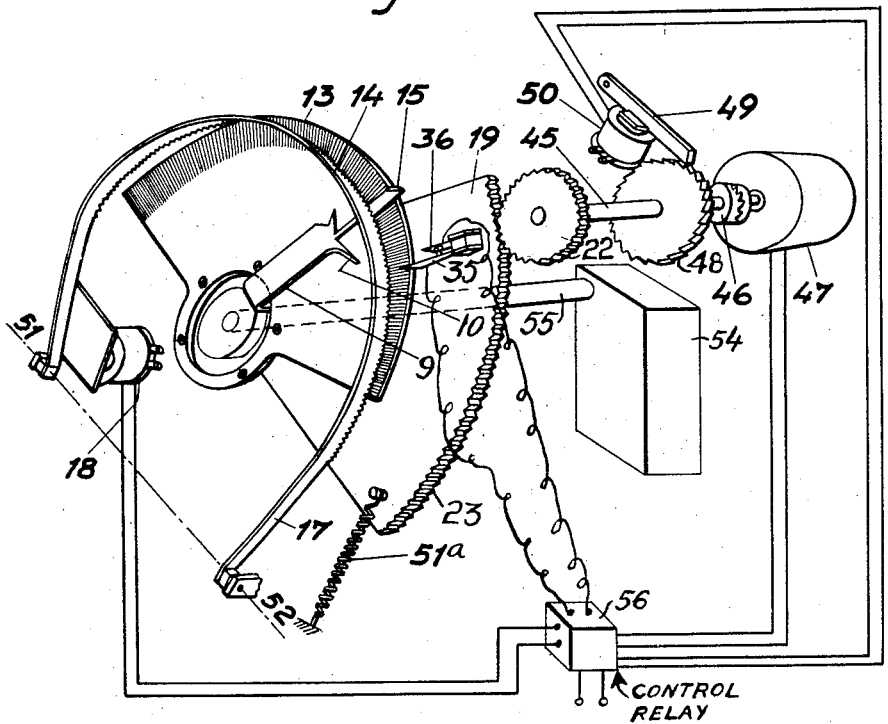
Fig. 6 shows another embodiment of the device.

The same reference numerals as in Figs. 1 to 5 have been used for the corresponding elements in Fig. 6. The member 19 testing the deviation of the instrument indicated by 54 consists of a toothed segment, the teeth 23 of which are in mesh with a gear wheel 22. The said gear wheel is located on a shaft 45 which, by means of a claw coupling 46, is coupled to an electromotor 47. The arm 9 is directly coupled to the instrument 54 by means of the shaft 55. The claw coupling is provided with bevelled teeth, and at least one of its toothed parts is yieldingly displaceable in relation to the other part of the claw coupling so that the claw coupling yields upon actuation of a twisting moment which is directed in one direction and has a value not exceeding a certain value, but not upon actuation of a twisting moment directed in the opposite direction. On the shaft 45 there is located a toothed wheel 48, the teeth of which can be engaged by a stop arm 49 by means of an electromagnet 50. The motor 47 is regulated by means of a relay 56, which also regulates the electromagnets 18 and 50.

The device according to Fig. 6 functions in the following way. When the deviation of the arm 9 which is coupled to the instrument 54, for instance a gyroscope, is to be tested, the motor 47 is started by cutting in a switch (not shown). The motor rotates clockwise on Fig. 6, whereby the gear wheel 22 rotates the toothed sector 19 anticlockwise. At the same time the relay closes the current in the electromagnet 18, which swings the arc 14, which is swingable round the shaft 51—52, towards the stationary arc 13. By this the cross piece 15 is tightly squeezed in between the arcs in the position which it has then assumed. On the toothed sector 19 there is fixed a normally closed switch 35, 36 connected to the relay in such a position that its one contact spring 35 engages the cross piece 15 when during the swinging of the toothed sector the switch passes the same, whereby the circuit in which the switch is connected, is broken. The relay 56 thereby reverses the direction of motion of the motor 47 so that it rotates in the opposite direction. The toothed sector 19 then swings back to a position in which the contact spring 35 is disengaged from the crosspiece 15, the circuit in which the switch 35, 36 is connected, being closed again. The just mentioned relay is constructed in such a way that at the new closing of the current it brakes the current to the motor 47 which is now rotating clockwise, and closes the current to the electromagnet 50 and breaks the current to the electromagnet 18. The said electromagnet swings the stop arm 49 to a position in which its free end engages the toothed wheel 48, whereby the movement of the said wheel and that of the toothed sector 19 are stopped. Due to the claw coupling 46, which in this direction of motion yields at a twisting moment exceeding a certain value, the rotation of the motor 47 is gradually stopped, whereby a jerk in the motor is avoided. For swinging the sector 19 back to its neutral position means are provided, by which the motor can be started again at said reversed direction.

The spring 51a acting upon the toothed sector 19 serves to counteract the tooth play between the toothed sector 19 and the gear wheel 22 and to swing back the toothed sector 19 when the motor 47 changes its direction of motion and rotates clockwise.

The device according to Fig. 6 has the advantage over the embodiment described with reference to Figs. 1 to 5 that the movement is caused to cease at a moment when the different members begin to move slowly as, after the reversion of the movement, they have not yet had time to be accelerated to a speed worth mentioning. By this the jerk is reduced when the stop arm 49 falls into the toothed wheel 48. Further the testing becomes more exact as the time lag of the electromagnet 50 and of the stop arm 49 thereby are of less importance.

In a modification of the device according to Fig. 6 the said relay is constructed in such a way that, when the switch 35, 36 closes the circuit again, it only closes the current through the electromagnet 50 of the stop arm 49 but does not break the current to the motor 47. The toothed wheel 48 is then stopped whereas, thanks to the yielding coupling, the motor 47 can continue its rotation. In this case it is suitable to replace the claw coupling 46 by a friction coupling.

By means of the device described above and illustrated on the drawings it is, thus, possible to mechanically test the deviation of a gyroscope or of any other instrument at any moment, without the testing device having any noticeable disturbing influence upon the instrument in question.

The arcs 13 and 14 should preferably be toothed or knurled on those surface parts facing the other arc in order to securely fix the position assumed of the cross piece at the squeezing of the cross piece 15 or analogous.

Such instruments can be electric, mechanical, hydraulic, pneumatic or other instruments of any kind, in which the arm corresponding to the arm 9 is rigidly connected with the shaft or the like driven by the instrument. Further, it is possible to mechanically control another device of any kind by means of a testing device according to the invention. For such purpose the gear wheel 22 or the toothed arc 23 is during the testing movement allowed to drive the device in question, which thus is driven proportionally to the angle through which the arm 19 has moved during the testing movement, and thus proportionally to the deviation of the used instrument on the occasion in question.

The present invention is of course not limited to the embodiment described above and illustrated on the accompanying drawing, but also other embodiments falling within the scope of the invention are possible. For example, the arc 14 with the arm 17 can be omitted, and instead thereof the cross piece 15 can be adapted to be sucked towards the arc 13 electromagnetically when testing is to be made. Thus, the electromagnet 18 can be replaced by any hydraulic, pneumatic, mechanical, electric, magnetic or other device.

Having now described our invention, what we claim as new and desire to secure by Letters Patent is:

1. Mechanical device for testing the deviation of an instrument, which comprises a first member connected to and driven by said instrument, means to retain said member stationary in the position assumed when the deviation is to be tested, a damping device, a second member operable at testing to be advanced towards and be stopped by the retained first member through said damping device, the distance through which the second member thus advances representing the deviation of the instrument, said damping device including two gear wheels mounted on said second member, one of said gear wheels having a recess normally facing the teeth of the other gear wheel, a projection located on the shaft of said first mentioned wheel engageable, when the said second member reaches said first retained member, by said first member and operable to turn the first wheel into position to mesh the teeth thereof with the teeth of the second wheel.

2. Mechanical device for testing the deviation of instruments, which comprises a first member connected to and driven by said instrument, means arranged to be actuated to retain said member stationary in the position assumed when the deviation is to be tested, an electric motor, a damping device, a second member advanced during testing by said electric motor towards and stopped by said first retained member through said damping device, the distance through which said second member is advanced representing the deviation of the instrument, said damping device being driven by a normally disengaged gear wheel arranged, when said second member at the testing has reached said first member, to be coupled to another gear wheel driven during testing movement whereby the damping device begins to function and brakes the testing movement of said second member, the motor being controlled by one of said wheels.

3. Mechanical device for testing the deviation of instruments, which comprises a first member connected to and driven by said instrument, an electromagnet, means arranged to be actuated by said electromagnet to retain said member stationary in the position assumed when the deviation is to be tested, a damping device, a second member advanced towards and stopped by said first retained member through said damping device, the distance through which said second member has advanced representing the deviation of the instrument, said damping device being driven by a normally disengaged gear wheel arranged, when said second member at the testing has reached said first member, to be coupled to another gear wheel driven during the testing movement by said second member, whereby the damping device begins to function and brakes the testing movement of said second member, the energization of said electromagnet being controlled by said normally disengaged wheel.

4. Mechanical device for testing deviation of an instrument including a first arm transversely swingably mounted with respect to an axis, a second arm driven by said instrument for movement transversely of and around said axis, means normally connecting the said arms to each other, retaining means for holding said first arm stationary when deviation is to be tested and operative to permit relative movement of said second arm with respect thereto, and a third arm swingably mounted transversely with respect to said axis and engageable with said first arm when the same is in its stationary position and means to move said third arm until the same engages said first arm, the distance traversed by said third arm representing the deviation of the instrument.

5. Mechanical device for testing the deviation of an instrument including a resilient first arm swingably mounted transversely with respect to an axis, a shaft concentric with said axis and driven by said instrument, a second arm fixed to said shaft for movement therewith transversely of the axis, a V-shaped member on said second arm disposed to straddle said first arm, said first arm being resiliently pressed against said V-shaped member, whereby the arms are yieldably connected to each other, means operative to move and thereby disengage the first arm from said member and to retain said first arm stationary in the position assumed when the deviation is to be tested and a third arm swingably mounted transversely about said axis and adapted to engage said first arm in its stationary position, the distance through which said third arm swings representing the deviation of the instrument.

6. Mechanical device for testing the deviation of an instrument including a resilient first arm transversely swingably mounted relative to an axis, a shaft concentric with said axis and driven by said instrument, a second arm fixed to said shaft for movement therewith transversely of said axis, a V-shaped member on said second arm the free ends of which straddle said first arm so that said first arm is normally resiliently pressed against the apex of said member, whereby the arms are yieldably connected to each other, means to retain said first arm stationary in the position assumed when the deviation is to be tested, said means being operative to disconnect the first arm from said member and thereby from said second arm, a third arm transversely swingably mounted with respect to said axis and engageable to said first arm in its stationary position, and means to move said third arm until the same engages said stationary first arm, the distance through which said third arm moves representing the deviation of the instrument.

7. A device as defined in and by claim 4 wherein the means operative to move and thereby disengage the first arm from said member and to retain said first arm stationary includes two arcs of the same diameter disposed concentric to said axis, said first arm extending between the arcs, one arc being stationary and the other arc being movable toward the stationary arc whereby when the deviation is to be tested said first arm is firmly retained between the arcs.

8. A device as defined in and by claim 7 and a cross piece mounted on said first arm transversely of said arcs and engageable thereby when deviation is being tested.

9. A device as defined in and by claim 5 wherein the means operative to move and thereby disengage the first arm from said member and to retain said first arm stationary includes a stationary arc and a movable arc of the same diameter and disposed concentric to said axis, said first arm extending between said arcs and projecting therebeyond, said movable arc being movable toward the stationary arc when the deviation is to be tested whereby said first arm is moved away from said second arm longitudinally of said axis and firmly retained in a stationary position between the arcs.

10. A device as defined in and by claim 7 wherein the means operative to move and thereby disengage the first arm from said member and to retain said first arm stationary includes a stationary arc and a movable arc of the same diameter and disposed concentric to said axis, said first arm extending between said arcs and projecting therebeyond, said movable arc being movable toward the stationary arc when the deviation is to be tested whereby said first arm is moved away from said second arm longitudinally of said axis and firmly retained in a stationary position between the arcs.

11. A device as defined in and by claim 4 wherein said retaining means comprises two arcs of the same diameter disposed concentric to said axis, said first arm extending between said arcs, one of said arcs being stationary and the other arm being movable toward the stationary arc so that when deviation is to be tested said movable arc moves said first arm away from said second arm and firmly retains said first arm in a stationary position between the arcs, the surface of one of said arcs that contacts said first arm being toothed.

12. A device as defined in and by claim 4 and a damping device for said third arm.

13. A device as defined in and by claim 4 wherein an electric motor is arranged for driving said third arm when testing the deviation the same being inoperative when said third arm has been stopped by said first arm.

14. A device as defined in and by claim 4 wherein an electromagnet is mounted for actuating said retaining means, said electromagnet being rendered inoperative when said third arm has been stopped by said first arm.

15. A mechanical device for testing the deviation of an instrument including a shaft connected to the instrument and movable upon deviation, an arm extending transversely of said shaft and partaking in said movement of deviation, normally inoperative retaining means for holding said arm stationary including a stationary member on one side of said arm and a movable member on the opposite side of said arm, a deviation determining element transversely swingable relative to the axis of said shaft and normally out of alignment with the arcuate path described by the end of said arm in its movement of deviation, means for actuating said retaining means when a deviation is to be tested to move said movable member and thereby said arm toward said stationary member to clamp said arm stationary in a position assumed upon deviation and in alignment with the path of movement of said deviation determining element, and means for moving said deviation determining element until the same engages said arm whereby the distance traversed by said deviation determining element represents the deviation of the instrument.

16. A device as defined in and by claim 15 wherein the stationary and movable members of said retaining means comprise a stationary and a movable arc of the same diameter disposed concentric to said axis, said arm extending between the arcs, said movable arc being movable toward the stationary arc when deviation is to be tested whereby said arm is firmly retained in a stationary position between and by said arcs, electrical means for actuating said movable arc, a relay and a switch, a reversible electric motor for driving said deviation determining element when testing the deviation, a circuit including said motor, a relay in said circuit controlling said motor, a normally closed switch in said circuit carried by said element and adapted to be opened during the transverse movement thereof by engagement with the arm in its stationary position to thereby condition said relay to reverse said motor, said element being swung in the opposite direction upon the reverse rotation of the motor to an extent sufficient to withdraw the switch from engagement with the arm whereupon said switch is re-closed and said relay is rendered operative to arrest movement of said element.

17. A device as defined in and by claim 15 wherein said deviation determining element is motor driven and a yieldable driving coupling connecting said motor with said element.

18. A device as defined in and by claim 15 provided with a reversible electric motor driving said deviation determining element and operable in one direction of rotation to swing said element forwardly when testing the deviation, a control circuit for said motor including a relay controlling said motor and its direction of rotation, a normally closed switch in circuit with said relay, mounted on said element and adapted to be opened during the forward movement of the element by engagement of the switch with the arm in its stationary position to thereby condition said relay to reverse said motor, said motor in its reverse rotation swinging said element in the opposite direction an extent sufficient to withdraw said switch from engagement with the arm whereby said switch is re-closed and said relay is operative to arrest movement of said element.

19. A device as defined in and by claim 15 provided with a reversible electric motor driving said deviation determining element and operable in one direction of rotation to swing said element forwardly when testing the deviation, a control circuit for said motor including relay means controlling said motor and its direction of rotation, a normally closed switch in circuit with said relay means, mounted on said element and adapted to be opened during the forward movement of the element by engagement of the switch with the arm in its stationary position to thereby condition said relay means to reverse said motor, said motor in its reverse rotation swinging said element in the opposite direction an extent sufficient to withdraw said switch from engagement with the arm whereby said switch is re-closed, and means in circuit with said relay means for arresting movement of the element, said arresting means being rendered operative by the relay means upon the re-closing of said switch.

20. A device as defined in and by claim 15 provided with a reversible electric motor driving said deviation determining element and operable in one direction of rotation to swing said element forwardly when testing the deviation, a control circuit for said motor including relay means controlling said motor and its direction of rotation, a normally closed switch in circuit with said relay, mounted on said element and adapted to be opened during the forward movement of the element by engagement of the switch with the arm in its stationary position to thereby condition said relay means to reverse said motor, said motor in its reverse rotation swinging said element in the opposite direction an extent sufficient to withdraw said switch from engagement with the arm whereby said switch is reclosed, a locking arm for arresting movement of said element, and electrically operable means for actuating said locking arm, said last mentioned means being in circuit with said relay means and operable upon the re-closing of said switch.

21. A device as defined in and by claim 15 provided with a reversible electric motor driving said deviation determining element and operable in one direction of rotation to swing said element forwardly when testing the deviation, a control circuit for said motor including relay means controlling said motor and its direction of rotation, a normally closed switch in circuit with said relay means, mounted on said element and adapted to be opened during the forward movement of the element by engagement of the switch with the arm in its stationary position to thereby condition said relay means to reverse said motor, said motor in its reverse rotation swinging said element in the opposite direction an extent sufficient to withdraw said switch from engagement with the arm whereby said switch is re-closed, electrically operable means in circuit with said relay means for arresting movement of the element upon re-closing of said switch and a yieldable connection between said motor and said elements.

ERIK ALVAR WILKENSON.
PER TORSTEN FAXÉN.

REFERENCES CITED

The following references are of record in the file of this patent:

UNITED STATES PATENTS

| Number | Name | Date |
|---|---|---|
| 667,652 | DeVilbiss | Feb. 5, 1901 |
| 1,214,507 | Breitinger | Feb. 6, 1917 |
| 1,559,525 | Murphy et al. | Oct. 27, 1925 |
| 1,830,987 | Eichler et al. | Nov. 30, 1931 |
| 2,058,431 | Eschenbacher | Oct. 27, 1936 |
| 2,323,734 | Stokes | July 6, 1943 |
| 2,422,960 | Giannini | June 24, 1947 |